350-96.25
7/4/78      XR    4,098,550  SR

United States Patent [19]
Randolph

[11] 4,098,550
[45] Jul. 4, 1978

[54] OMNI-DIRECTIONAL MOVING PICTURE TAKING AND EXHIBITING APPARATUS

[76] Inventor: John W. Randolph, 1446 Jellick Ave., Roland Heights, Calif. 91748

[21] Appl. No.: 671,316

[22] Filed: Mar. 29, 1976

[51] Int. Cl.² .............................................. G03B 37/00
[52] U.S. Cl. .................... 352/69; 350/96.25; 350/120
[58] Field of Search ............... 352/69; 350/96 B, 120; 355/133; 354/94, 95

[56] References Cited

U.S. PATENT DOCUMENTS

| | | | |
|---|---|---|---|
| 2,348,818 | 5/1944 | Jacobson | 350/120 |
| 2,939,362 | 6/1960 | Cole | 350/96 B |
| 3,502,401 | 3/1970 | Thompson | 352/69 |
| 3,754,827 | 8/1973 | Okada | 355/133 |

*Primary Examiner*—Monroe H. Hayes
*Attorney, Agent, or Firm*—Roger A. Marrs

[57] ABSTRACT

Motion picture apparatus is disclosed herein having a light source supplying light to a collective end of a plurality of light wave carrier bundles. A film carrying a plurality of images per frame is interposed between the light source and the light wave carrying bundles so the images are conducted to the opposite or terminal ends of the carriers for application to a segmented or curved screen surface via a lens system. The respective light wave carrier ends are mounted on dynamic scanning plates so that synchronous movement of the carrier ends is produced for improved picture resolution during picture taking and picture viewing.

3 Claims, 8 Drawing Figures

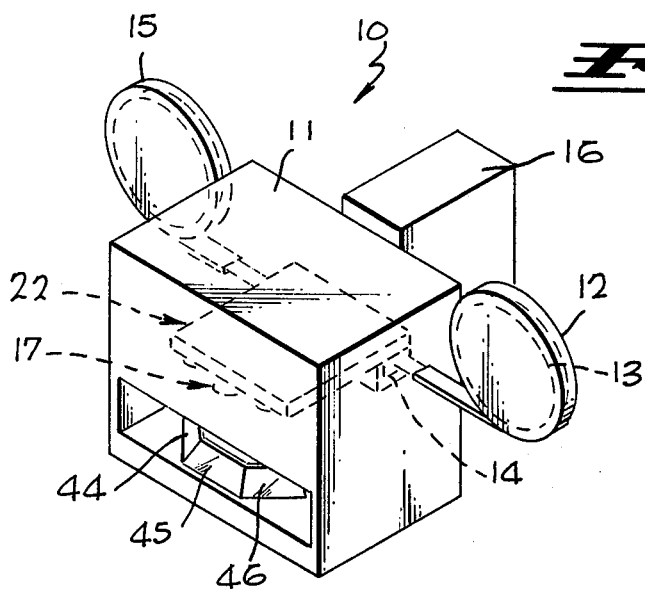
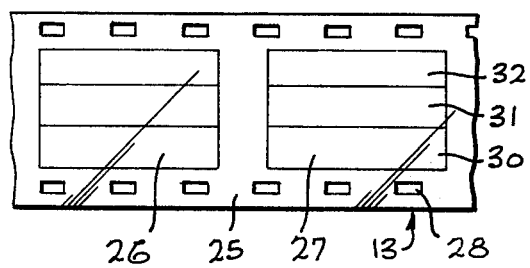
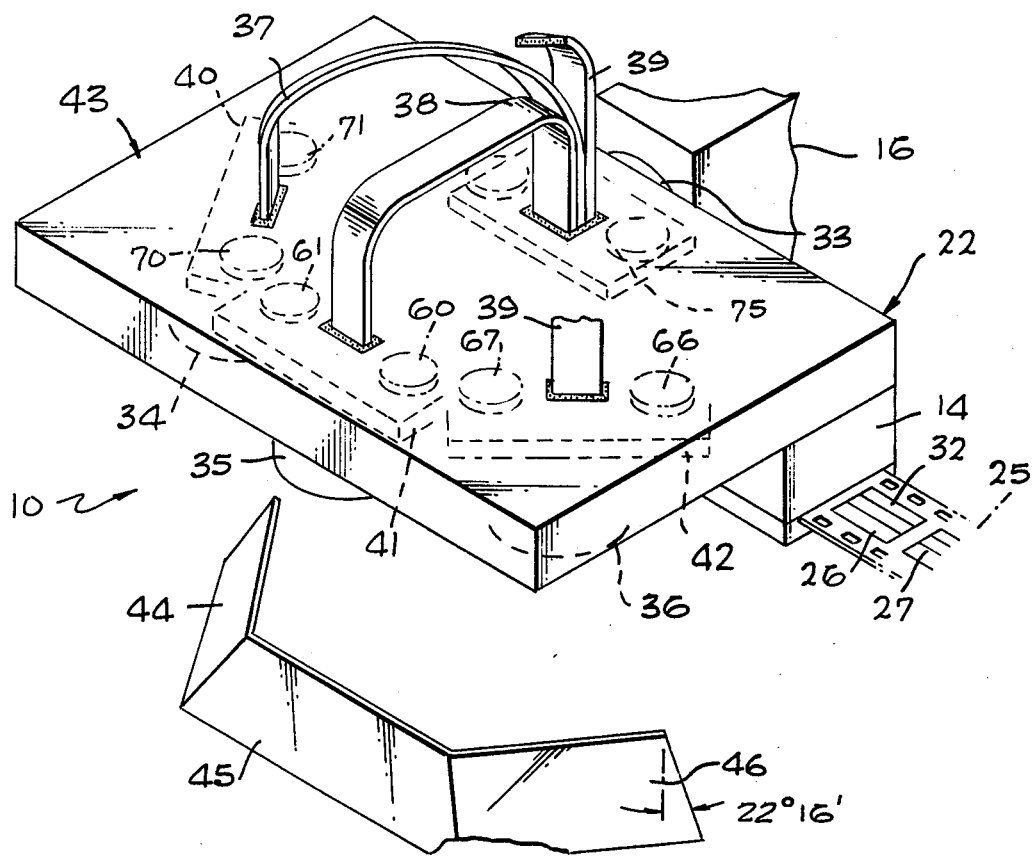

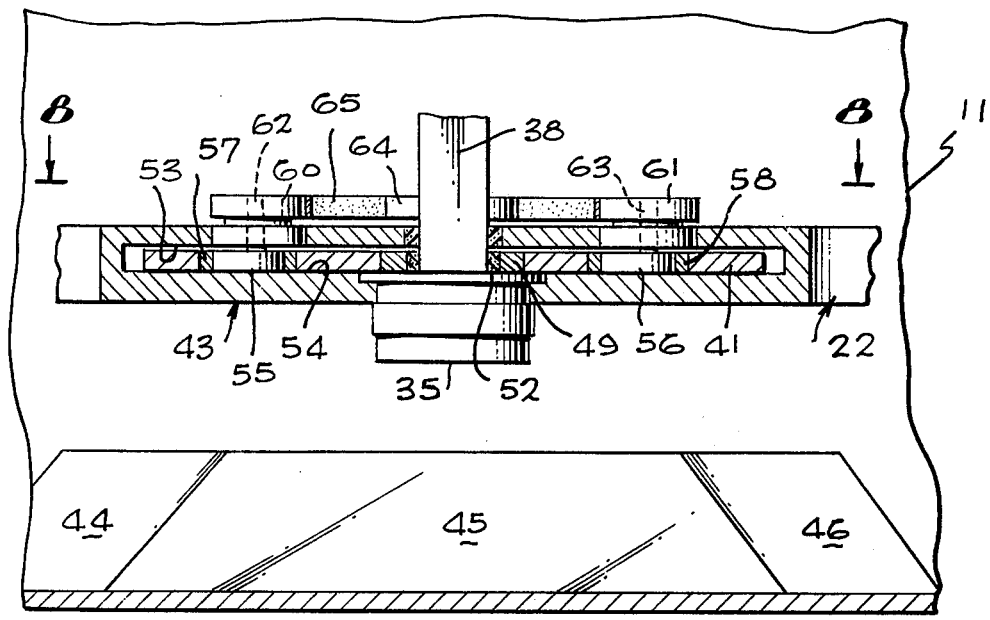
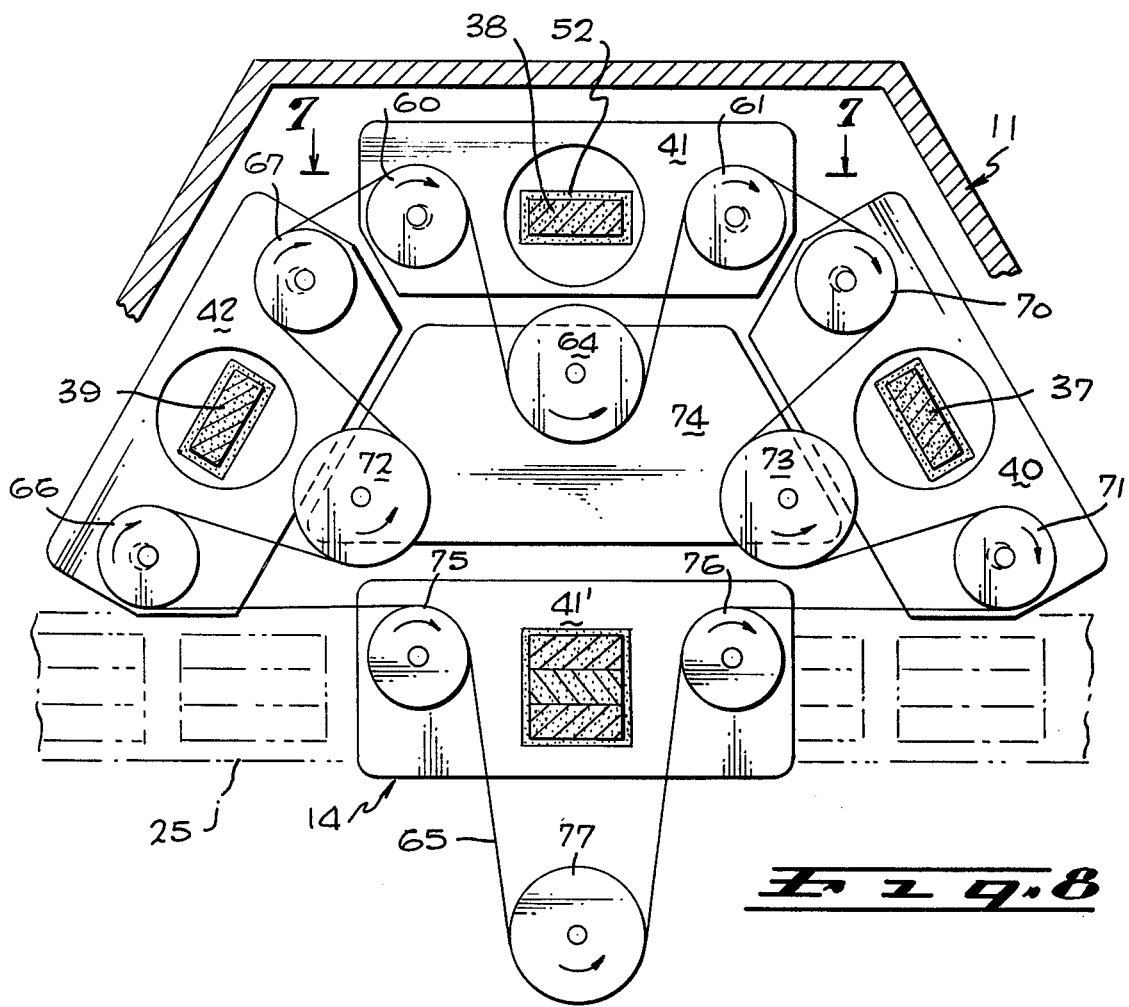

OMNI-DIRECTIONAL MOVING PICTURE TAKING AND EXHIBITING APPARATUS

BACKGROUND OF THE INVENTION

1. Field of the Invention

The present invention relates to apparatus for still or motion picture presentations and more particularly relates to a novel film projection and presentation apparatus providing the illusion of a continuous picture on a composite circular screen.

2. Brief Description of the Prior Art

It has been a conventional practice in the motion picture industry to provide a seemingly continuous motion picture covering a circular field of 360° by employing a plurality of curved screens arranged in a circle with the audience being located within the space encompassed by the screen. One or more film projectors are usually associated with each screen and the resulting plurality of projectors are sometimes disposed centrally of the screen or are disposed behind the screen for rear projection.

However, the central positioning of the projectors and presence of a projectionist seriously limits the amount of space available to accommodate an audience. Further, the space occupied by the centrally located projectors at the center of the screen is the optimum location for viewing the picture. The location of the projectors at the center of the viewing area also constitutes a serious source of disturbance to the audience because of the noise, light and heat attendant to the operation of the projector equipment.

To avoid the difficulties and problems attendant to centrally located projectors within the theatre, the motion picture industry has sometimes used a method or procedure known as "rear projection" according to which a still or moving picture is projected onto the backside of a translucent screen. This procedure has sometimes been found desirable since the projectors can be remotely located from the audience so that picture images can be projected on the reverse side of a translucent screen which can then be viewed from the front of the screen by the audience. This procedure also permits the screen to be used as a backdrop for settings during dramatic presentations so that actors performing in the drama can move about in front of the screen without interfering with the projection of images from the projector.

Generally, the plurality of curved screens in a conventional 360° screening system are arranged in a side-by-side relationship whereby images projected from a plurality of projectors form continuous images along the blend lines where adjacent component images join. The employment of such a system necessitates that the films to be projected must be carefully matched with regards to color, action and timing which is expensive and time consuming. In the past, a serious viewing condition has been encountered when employing such systems which is known as "image distortion" that occurs in the areas of the composite images along the blend lines where adjacent component images join. This image distortion may be disproportionate change of image size either in the expansion or shrinkage, and uner extreme conditions there may be complete disappearance of an object during the passage through a blend area from one part of the component image to another. Also, under some circumstances, a bright streak will occur where the film images meet in the blend line due to overlapping or mismatching of film images causing double light exposure.

The difficulties and problems encountered with conventional projection and screening systems are obviated by the present invention which provides a film viewing arrangement for producing the effect or illusion that the spectator is actually in and surrounded by the environment depicted. For example, if the scene is of an underwater view in which people, fish and underwater flora are depicted, the spectator in his normal field of vision, will see the complete underwater scene on all sides and overhead, so as to produce the illusion that the spectator is actually under water, rather than merely looking at a picture of an underwater scene covering only a small portion of the normal field of vision. For dramatic effect, certain portions of the entire picture may be enlarged to show either detail of movement and emotions or perhaps facial expressions while the remaining portion of the complete picture is of a different and lesser image size. This dramatic effect is not possible by employing the teachings of the prior art. The present invention offers greater opportunities for creative film making and the broadening of dramatic scope due to its unique organization of separately controllable screens.

Therefore, a long standing need has existed to provide a motion picture taking and projection system which is compact physical arrangement and which provides improved picture resolution, particularly in the edge marginal regions of adjacent viewing images projected from separate images carried on a common film strip.

SUMMARY OF THE INVENTION

Accordingly, the problems and difficulties encountered with prior motion picture taking and projection systems are obviated by the present invention which provides a novel apparatus having a light source supplying light to a plurality of light wave carriers. A film strip carrying an equal number or plurality of images per frame is interposed between the light source and one end of the plurality of light wave carriers. Each carrier is coherent multiple fiber light wave carrying device which conducts and directs the image to a lens system for projection onto a screen having viewing areas equal in number to the respective plurality of light wave carriers and plurality of images per frame. Means are provided in operable connection to the opposite ends of the light wave carriers for dynamic scanning by synchronously moving the respective ends of the light wave carriers whereby the projected images are vibrated to provide improved resolution at the interface of adjacent edge marginal regions of the projected images, and to eliminate grainy image emergence from the fiber carriers.

It is a primary object of the present invention to provide a motion picture apparatus which will take and project the film images provided by the herein disclosed inventive concept onto the inside of a hemisphere so that visually the images appear to form a unitary projection.

A further primary object of the invention is to provide a motion picture camera and projector with a series of coherent multiple fiber bundles wherein each camera and projector includes a means of dynamic scanning where the fiber bundles are made to move synchronously so that both ends of the bundles are moved in an identical random pattern, shifting the system a few fiber diameters at a time to increase the image resolution of the recorded and projected information.

A further object of the invention is to provide the motion picture projector with a means to adjust the light from the light sources so that each segment of each film frame has the equal and exact illumination so that the separate segments are not discernible on the screen.

A further object of the invention consists in providing the camera with a series of coherent multiple fiber bundles, one for each lens system, which directs the light from the lens system to the film where it is recorded and wherein the fiber bundles are given a definite configuration so that the recorded scene can be shaped to conform with the dimensions of each film frame.

A further object of the invention is to provide a motion picture camera and projector with a plurality of lens systems. The lens systems are so directed that they encompass an area suitable for the presentation of wide angle curved screen presentations and are so directed as to cause the field of vision entering the lens system to record and display the area necessary and further so that the setting of each lens system is such that, while the information being recorded is exactly one against the other, there is no overlapping of scenes from one lens system to the next.

A further object of the invention consists in providing the camera with a series of coherent multiple fiber bundles, one for each lens system, which directs the light from the lens system onto the film where it is recorded. Further the fiber bundles are given a definite configuration so that the recorded scene can be shaped to conform to the dimensions of each film frame.

A further object of the invention consists in providing the projector with a series of coherent multiple fiber bundles, one for each lens system, which directs the light from the light source, once it has passed through the exposed film, to the lens system where it is projected on the screen. Further the fiber bundles are given a definite configuration so they conform to the shape on the film frame and further the shape at the exit end of each bundle is the same as on the camera so that information is projected in the same manner in which it was recorded by the lens system on the camera.

Still another object of the present invention is to provide a novel motion picture apparatus incorporating dynamic scanning means for image grain elimination and for improved viewing resolution of projected film images.

A further object of the present invention is to provide a novel dynamic scanning apparatus for motion picture cameras and projectors utilizing optical fiber bundles for conducting images and incorporating means for moving both ends of the bundles in an identical random pattern for eliminating image grain and distortion of recorded or projected film images.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a perspective view of a novel motion picture projector incorporating the inventive concepts of the present invention;

FIG. 2 is a diagrammatic, enlarged illustration of a portion of a typical film strip employed in the practice of the present invention;

FIG. 3 is a perspective view of a projection apparatus for projecting images carried on the film strip shown in FIG. 2 and further illustrating the employment of optical fiber bundles for directing the images from the film strip to a lens and projection system;

FIG. 7 is an enlarged sectional view of the dynamic scanning means employed in the projection apparatus shown in FIG. 8 as taken in the direction of arrows 7—7 thereof; and FIG. 8 is a sectional view of the dynamic scanning means shown in FIG. 7 as taken essentially in the direction of arrows 8—8 thereof.

DESCRIPTION OF THE PREFERRED EMBODIMENT

Figure 4:
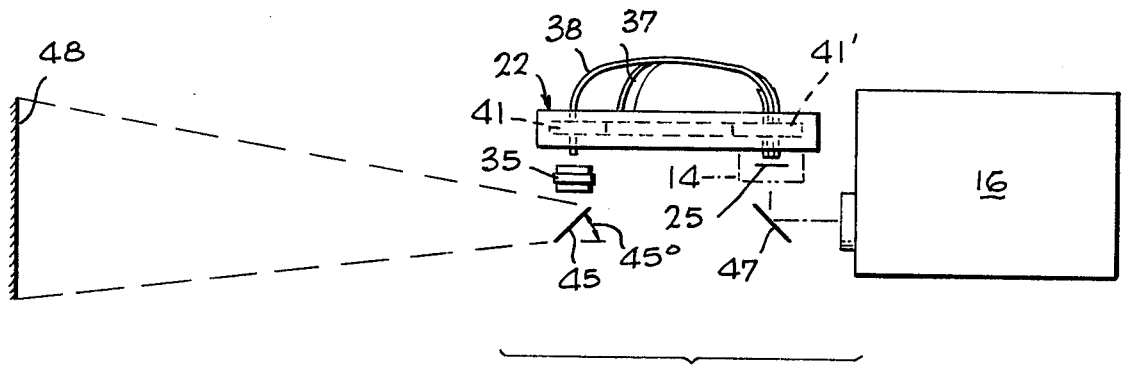
FIG. 4 is a diagrammatic view of the projection apparatus shown in FIG. 3 showing projection of the film image onto a hemispherical screen.

Referring to FIG. 1, a novel motion picture apparatus is indicated in the general direction of arrow 10 which represents an exhibiting projector enclosed within a case 11. Although the present invention relates to cameras and projectors, a projector will be described for simplication. A film feed reel 12 is carried on one side of the case 11 and a takeup reel 15 is operably carried on the opposite side so that film 13 stored on reel 12 may be processed through the apparatus by a conventional film transport mechanism 14 to the takeup reel 15. The film 13 is processed between a light source 16 and an image collection means (to be described later) located adjacent the film transport mechanism 14 wherein the images are carried to a lens system 17 for introduction transmission mirrors 44–46 for projection onto a viewing screen. The dynamic scanning means of the present invention is generally illustrated by the numeral 22 which includes synchronous means for moving the collective and the terminal ends of the image carrying system for improved picture resolution and grain elimination.

In practicing the present invention, the strip of film 13 is produced which is typified in the drawing of FIG. 2. The portion of film strip 13 is identified by numeral 25 and a pair of frames 26 and 27 are illustrated in alignment with each other for sequential processing past the light source 16. The edge marginal regions of the film strip 25 include a plurality of sprocket holes 28 for advancing the film by means of the conventional film transport mechanism 14. The respective film images carried in the plurality of frames, such as frames 26 and 27, are segmented so that, for present purposes, at least three image segments 30–32 inclusive are representative on each frame.

Problems encountered with image segments are twofold. Firstly, the plurality of images or image segments must be placed or recorded on the film in the respective frames so there is a minimum or complete deletion of distortion at the adjacent edges of the respective image segments. Secondly, problems reside in the sensing or projecting of the image segments from the film onto a screen. In the first instance, a camera is required having the novel dynamic scanning means of the present invention which reduces, removes and eliminates distortion caused by the inherent undesired patterns incurred during manufacture of fiber optical bundles serving as light wave carriers. Also, the novel dynamic scanning means may be employed in a projector for eliminating the distortion caused by graininess which is inherent in the projecting through coherent optical light wave carriers.

Since the dynamic scanning means is used to obviate these problems in both the camera and projector, the present description will be related to a projection system since repeat is not necessary for the camera apparatus.

In FIG. 3, the film strip 25 is introduced to the projection apparatus 10 via a film transport system indicated by numeral 14 which may be of any conventional nature for advancing the film strip from storage reel 12 through the projection apparatus onto the takeup reel 15. The projection apparatus further includes a light source 16 having an aperture device 33 for directing a light beam into the film transport means for the purpose of illuminating the individual frames of the film strip as the strip is advanced past the beam. The projection apparatus also includes a plurality of lens systems identified by numerals 34, 35 and 36 respectively. It is understood that the number of lens systems required are equal to the number of individual image segments carried on each of the respective frames of the film strip. For conducting or directing each of the image segments from its respective frame to its associated lens system, a coherent optical fiber bundle is interposed between the film transport mechanism 14 and each of the respective lens systems. For example, the image segment 32 is sensed by a collective end of fiber bundle 37 and the opposite or terminating end of fiber bundle 37 is associated with lens system 34. It is to be understood that the fiber bundles described herein are conventional in the state of the art and comprise a multiplicity of light carrying glass or glass-like filaments which are held together in a unitary coherent bundle. Fiber bundles 38 and 39 are associated with image segments 30 and 31 respectively.

It can be seen that the plurality of fiber bundles, such as bundles 37, 38 and 39, form loops wherein their opposite ends are secured to movable plates identified by numerals 40-42 inclusive. The bundles form loops which extend above and over a housing 43 which movably carries the plates 40-42 associated with exit or terminal ends while plate 41' supports the combined collective ends. The housing and plates as well as the bundles form the novel dynamic scanning means of the present invention. The inventive concept further includes projecting the image segments in a predetermined order onto a viewing screen. In order to achieve projection of the plurality of image segments onto the screen, the screen is circular and will be oriented in the present description to a 180° presentation. This is achieved by conducting each of the image segments onto a portion of the viewing screen via transmission mirrors which are identified by numerals 44, 45 and 46 respectively. The projection apparatus including the transmission mirrors 44-46 are located over the heads of the audience and in a central location whereby the transmission mirrors are angled with respect to one another so as to throw or cast the image segments onto respective portions of the circular screen. The various angles are shown in detail FIGS. 3-5 respectively which insure proper projection of each of the respective images. Therefore, it can be seen that image segment 32 carried on frame 26 is sensed by the collective end of bundle 37 and directed via lens system 34 onto its associated transmission mirror 44 for projection onto a side portion of the circular screen. Transmission mirror 45 is associated with the central portion of the screen and therefore carries the middle or center film image segment 31 while the transmission mirror 44 carries the other side of the total picture represented by the image segment 30.

Referring now in detail to FIG. 4, it is further evident that the light means emanating from the light source 16 is directed against a cold mirror 47 which serves as an infrared filter. The cold mirror 47 also redirects the light source or beam into the film transport 14 where the beam impinges against the film strip 25. It can be seen that the collective ends of the fiber bundles are combined at the film transport mechanism on common plate 41' for sensing the recorded film images and for processing the images to the opposite or terminal ends of the fiber bundles for presentation to the respective lens system. The image segments emerging from all of the fiber bundles generally include a grainy texture. However, by employing the novel dynamic scanning means of the present invention, the grain is eliminated and this provides for improved resolution of the viewing projected images. The present means includes plates 40-42 within housing 43 which moves both ends of the fiber bundles in an identical random pattern whereby the directed or transmitted image segments are shifted in the system a few fiber diameters at a time. Therefore, both ends of the fiber bundles must move in synchronization. Such movement improves the resolution of the projected images by removing the pattern of bundles, removing dots normally present because of broken fibers in the bundles. In the past, space filtering techniques have been employed for improving resolution caused by these factors. However, space filtering is produced with different layers of thickness of transparent material placed over the lenses which receive images from the bundles. Experience has proven the images are still distorted and result in less resolution than can be achieved through dynamic scanning techniques.

Continuing with the description of FIG. 4, it can be seen that the image segments are introduced to the viewing surface of the screen 48 via the arrangement of transmission mirrors such as represented by the center mirror 45. Preferably the mirrors are arranged at a 45° angle with respect to the viewing screen so that the direction of the image segment from the lens is received and transferred to the viewing screen. Also, the plates 40-42 are illustrated as being movably disposed with respect to the housing or case 43. Preferably, the plates 40-42 are synchronously moved with respect to the housing by means of an eccentric device which may be electrically operated. The eccentric device induces minute vibrations or movements equal to a few fiber diameters to the movable plates so that the opposite ends of the respective fiber bundles are moved in an indentical random pattern. By employing an eccentric device, a variety of frequencies may be introduced to the device wherein the various frequencies provide different vibration to allow for different grain elimination or reduction. Furthermore, different vibrations or frequencies create different harmonics in the moving plates which may be used to advantage in obtaining desired resolution.

Figure 5:
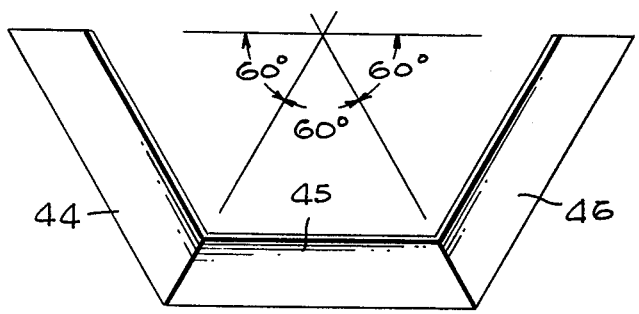
FIG. 5 is a plan view of the projection mirrors employed in the apparatus of FIGS. 1 and 3.

In FIG. 5, the arrangement of the mirrors 44–46 inclusive are illustrated to show that the mirrors are arranged at approximately 60° apart having a common center represented by the projection apparatus. It is to be understood that for illustrative purposes, 180° of projection is being considered; however, 120° of projection may be considered or 360° presentation or display may be envisioned by employing additional fiber bundles and additional lens systems as well as additional associated mirrors.

Figure 6:
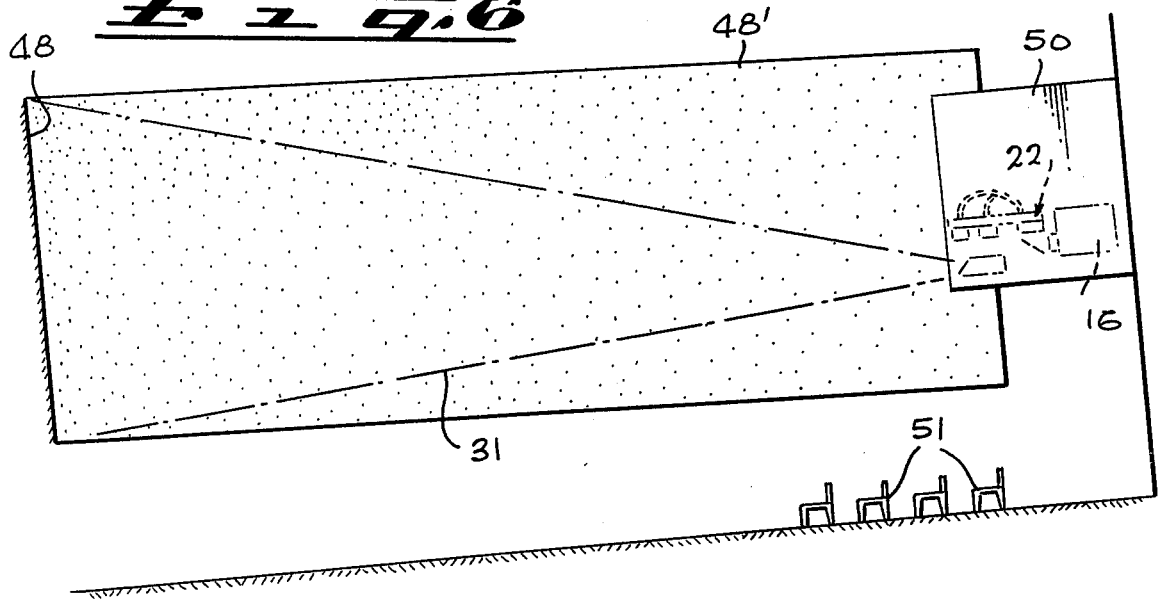
FIG. 6 is a view similar to the view of FIG. 4 illustrating full projection of the film image onto the circular screen having the projection apparatus mounted above the audience area.

In FIG. 6, the inventive concept is illustrated in elevational view wherein it can be seen that the projector apparatus is carried within a suitable compartment 50 and that this compartment is preferably suspended or downwardly depending from the roof or ceiling of the structure so that the projector apparatus is above the heads of the audience. The audience is situated in an area represented by a plurality of chairs or seats 51 arranged in suitable rows or columns for audience viewing of the image displayed on the screen 48. As illustrated, screen 48 is the central portion of the screen on which the central image segment 31 of the film strip 25 is projected. Portion of the screen indicated by the numeral 48 is to the side of the central screen and displays the image segment 32 carried on the film strip 25.

Referring now in detail to FIG. 7, the projection apparatus includes the overall case or enclosure 11 which houses the plurality of fiber bundles 37–39 inclusive. It can be seen in the cross sectional view that the terminal and collective ends of the fiber bundles are held in place on the associated plates by a suitable securement material such as epoxy compound disposed in a locking collar so that the bundles are carried on their respective plates. Numeral 52 represents the compound material and numeral 49 is a collar holding the terminal end of bundle 38 to its plate 41. The plate 41 is arranged to move slightly or vibrate between upper surface indicated by numeral 53 and lower surface 54 of the housing 43. Therefore, when the shifting or vibrating device is in operation, the plate 41, as well as the other plates 40, 41' and 42, moves or shifts in a manner so that the opposite ends of the fiber bundles move a few fiber diameters at a time. This jiggling or shifting movement is the heart of the dynamic scanning method. Preferably, the lens systems 34–36 inclusive are carried on the underside of the housing 43. However, it is again to be understood that the end of the fiber bundles move with respect to the case 11 and housing 25 including the lens system. The plates 40, 41, 41' and 42 are movably secured to the ends of the fiber bundles via mounts 52 so that the respective plate vibration is transmitted directly into the bundles to effect the shifting or jiggling movement required by the inventive concept.

Continuing with the detailed description of FIG. 7, the dynamic scanning means of the present invention is illustrated substantially in cross section in connection with the plate 41 for jiggling or moving the bundle of fiber 38. In this connection, it is noted that the case 43 encloses plate 41 and that plate 41 can move with respect to the housing 43 since the opposite faces of the plate are mounted between the opposing surfaces 53 and 54. The plate is moved by means of eccentrics 55 and 56 which are mounted in bearings 57 and 58. As the eccentrics 55 and 56 are rotated, the plate 41 will move accordingly. The eccentrics are rotated by means of wheels j60 and 61 which are connected to the eccentrics via shafts 62 and 63. The wheels 60 and 61 are moved by means of a motor 77 which drives an idler wheel 64 as well as the pulley wheels 60 and 61 via a belt 65. The pulley wheels 60, 61 and 64 are set in respective bearings by stub shaft mounted on housing 43.

Referring now to FIG. 8 in detail, the dynamic scanning means of the present invention is expanded to show that the movement of plates 40 and 42 are in synchronization with the movement of plate 41 by means of eccentrics 66 snd 67 associated with the plate 42 and eccentrics 70 and 71 associated with the plate 40. The pulley belt 65 is trained about all the eccentrics and about idler 64 as well as idler 72 and 73. All of the idlers are carried on a stationary mount 74 which is carried on the housing 43. The collective ends of the fiber bundles are carried on plate 41' which is mounted on the film transport mechanism 14. Also, wheels 75 and 76 tension the pulley belt 65 and also it can be seen that the pulley belt is driven by motor 77. By the dynamic scanning means, scanning achieved by the respective ends of the coherent fiber bundles is accomplished in phase and any point on the plates rotate in a circle of approximate 3 fiber diameters for full scanning effect. The fiber bundles representing light wave carrier are moved synchronously so that improved picture resolution during picture taking in the case of a camera and picture viewing in the case of a projector is achieved.

In view of the foregoing, it can be seen that the motion picture apparatus of the present invention, including the dynamic scanning means and the optical coherent fiber bundles, present a means for improving picture resolution and eliminating grainy texture. The opposite ends of the light wave carrying bundle are synchronously moved in a random pattern by the dynamic scanning means and the illustrated means for effecting such movement is the eccentric translation means for moving the respective plates 40–42 inclusive. Other means may be employed than the use of eccentric discs, such as a vibrator, and other mounting means may be employed for movably relating the ends of the bundles to the plates than the illustrated epoxy material 52. The dynamic scanning means removes graininess normally attendant in motion picture projection and removes minute dark spots caused by broken fibers normally encountered in fiber optics which are due to breakage of fibers during the manufacturing process. The resultant picture placed on the film in the form of image segments is far superior to that which can otherwise be produced using conventional camera techniques and the resultant image which is projected and viewed by an audience is greatly improved over that which is projected by conventional exhibiting equipment.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. Omni-directional moving picture apparatus for conducting a visual image from one place to another comprising the combination of:
    a housing having lens means for sensing the image and means remote from said lens means for storing the sensed image;

a plurality of elongated light wave carriers intercommunicating between said lens means and said storage means for conducting the image therebetween;

dynamic scanning means operably connected to the opposite ends of said light wave carriers for providing synchronous movement of said opposite light wave carrier ends in a random pattern for improved image resolution;

each of said light wave carriers is a coherent multiple optical fiber bundle for conducting the visual image between the opposite ends of said bundle;

said dynamic scanning means includes a fixed housing and plates carrying the opposite ends of each of said bundles so as to be movably mounted with respect to said housing;

means carried on said housing for moving said plates in said synchronous random pattern with respect to said housing;

an image storage means for holding the visual image conducted by said coherent optical fiber bundles;

said plate moving means includes a plurality of eccentric means carried on each of said plates and means operably coupled to each of said eccentric means for imparting movement thereto;

a selected end of all of said fiber bundles are carried on a common one of said movable plates and said fiber bundles radiate outwardly therefrom whereby the opposite ends of said bundles are carried on individual and spaced apart plates;

said storage means is a substantially curved screen and said moving picture apparatus is a film image projector having said housing and said lens systems at the center thereof;

said lens means includs a projection mirror arrangement for conducting the respective number of film images from said light wave carriers to said screen; and said screen is composed of two or more flat screens arranged with their opposing adjacent ends together at an acute angle.

2. The invention as defined in claim 1 wherein said screen is composed of at least three flat screen angularly disposed with respect to each other at least 60° apart.

3. The invention as defined in claim 2 wherein said lens means includes projection mirrors of equal number to said flat screens and angular 60° with respect to each other as well as 45° with respect to the optical axis of said associated lens.

* * * * *